March 17, 1953 — F. H. OSBORNE — 2,631,856
AUTOMATIC PHONOGRAPH
Filed Oct. 25, 1946 — 8 Sheets-Sheet 1

INVENTOR.
FRED H. OSBORNE.
BY
Lockwood Goldsmith & Galt,
ATTORNEYS.

March 17, 1953 F. H. OSBORNE 2,631,856
AUTOMATIC PHONOGRAPH
Filed Oct. 25, 1946 8 Sheets-Sheet 2

INVENTOR.
FRED H. OSBORNE.
BY
Lockwood, Goldsmith & Galt
ATTORNEYS.

March 17, 1953     F. H. OSBORNE     2,631,856
AUTOMATIC PHONOGRAPH Filed Oct. 25, 1946     8 Sheets-Sheet 3

INVENTOR.
FRED H. OSBORNE.
BY
Lockwood, Goldsmith & Galt,
ATTORNEYS.

March 17, 1953 F. H. OSBORNE 2,631,856
AUTOMATIC PHONOGRAPH
Filed Oct. 25, 1946 8 Sheets-Sheet 6

FIG. 9

INVENTOR.
FRED H. OSBORNE.
BY
Lockwood, Goldsmith & Galt.
ATTORNEYS.

March 17, 1953 F. H. OSBORNE 2,631,856
AUTOMATIC PHONOGRAPH
Filed Oct. 25, 1946 8 Sheets-Sheet 7

FIG. 10

INVENTOR.
FRED H. OSBORNE,
BY
Lockwood, Goldsmith & Galt
ATTORNEYS.

March 17, 1953  F. H. OSBORNE  2,631,856
AUTOMATIC PHONOGRAPH
Filed Oct. 25, 1946  8 Sheets-Sheet 8

INVENTOR.
FRED H. OSBORNE.
BY
Lockwood Goldsmith & Galt,
ATTORNEYS.

Patented Mar. 17, 1953

2,631,856

UNITED STATES PATENT OFFICE 2,631,856

AUTOMATIC PHONOGRAPH

Fred H. Osborne, Snyder, N. Y., assignor to The Rudolph Wurlitzer Company, Chicago, Ill., a corporation Application October 25, 1946, Serial No. 705,713

5 Claims. (Cl. 274—10)

1

This invention relates to an automatic phonograph, particularly a phonograph capable of playing a large number of records automatically and selectively through manual selection of one or more of said records to be played, reference being had to Letters Patent No. 2,002,236, to Wilcox, granted May 21, 1935, for Automatic Phonograph, and Letters Patent No. 2,189,077, to Maurer, granted February 6, 1940, for Automatic Phonograph.

The object of the invention is to provide an automatic record changer having selective control of the records to be played, wherein a large number of records may be supported in trays movable from storage position to a position over a vertical reciprocating turntable adapted to automatically engage and raise the record from a selected tray for play.

One feature of the invention resides in a record changer of this character which will permit playing of a large number of records in a comparatively small and compact mechanism, and wherein the movements of the various parts thereof are maintained under close control for accurate record manipulation.

Another feature of the invention resides in the mechanism such as will invariably locate the needle or stylus of the reproducer in the peripheral groove in the beginning of the record to be played, and wherein such record will be accurately positioned by the turntable in playing position relative to the playing needle.

Another feature of the invention resides in effective mechanism to bring the record changing mechanism into rest position and retain it in such position until the playing of a record commences, such features of the mechanism combining to avoid record breakage.

Other features of the invention reside in the multi-selective control of the record selection, whereby any desired number of selections may be made substantially simultaneously and the records played in turn according to their respective selections. This has to do with the electrically actuated mechanism which may remotely control the record selection through selective circuits therefor and simultaneously close the phonograph operating circuit to maintain the phonograph in automatic operation so long as a selection remains to be played and the required coin and payment thereof has been made.

Another feature of the invention resides in the spring lift turntable, such as to pick up a record from its tray and yieldingly present it to the reproducer for play with a cushion-like effect, and

2 wherein the bearing support of said turntable is readily demountable.

The full nature of the invention will be understood from the accompanying drawings and the following description and claims:

Figures 1, 2:
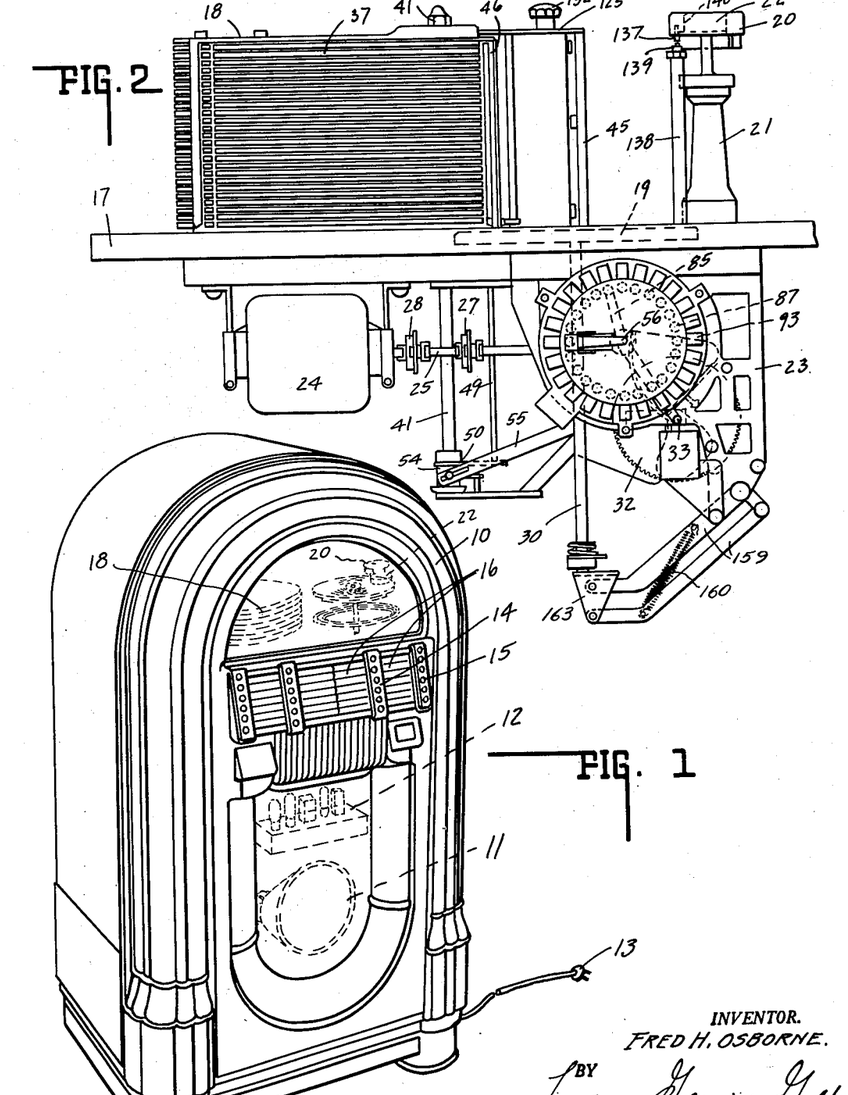
Fig. 1 is a front elevation of a multi-selective phonograph embodying the invention.
Fig. 2 is a front elevation of the record changing chassis thereof.

In the drawings there is shown a cabinet 10 housing a loud speaker 11, an electric sound amplifier circuit indicated at 12 to be electrically connected with a source of electric current indicated at 13. Said cabinet is provided with a panel 14 incorporating a series of selector buttons 15, one for each record of the phonograph, said records being indicated as to title as shown in the title panel 16.

Mounted within said cabinet there is a record changing mechanism supported as a unit on the base plate 17. Supported upon and above the base plate there is a magazine for records generally indicated at 18, a turntable 19 movable upwardly from said base plate to record playing position, and a swinging tone arm 20 supported upon a standard 21 for carrying a reproducer head 22 with its stylus in record engagement for reproduction. Depending from the base plate there is provided a frame structure 23 for supporting the control mechanism as hereinafter described, by which the records are selected from the magazine 18 and presented by the rotating table 19 to the reproducer 22 for the playing thereof.

Suspended from the bottom of the plate 17 there is an electric record changing motor 24 suitably connected with a source of current 13, and which drives the moving parts of the phonograph. Shaft 25 of said motor is supported by suitable bearings in the frame 23, and is provided with a worm 26 through the universal drive connections 27 and 28. Said worm 26 meshes with a worm wheel 29 which transmits motion to the turntable spindle 30 to rotate said turntable during the playing of a record. Said motor shaft 25 is also provided with a worm 31 which meshes with a worm wheel 32. Through the worm wheel 32 and a suitable clutch, the motor drives a cam shaft 33. Said cam shaft operates a cam 34 for controlling the raising and lowering of the turntable, a cam 35 which operates the record selecting mechanism, and a cam 36 which swings a selected record tray into record playing position.

Record magazine

Figure 7:
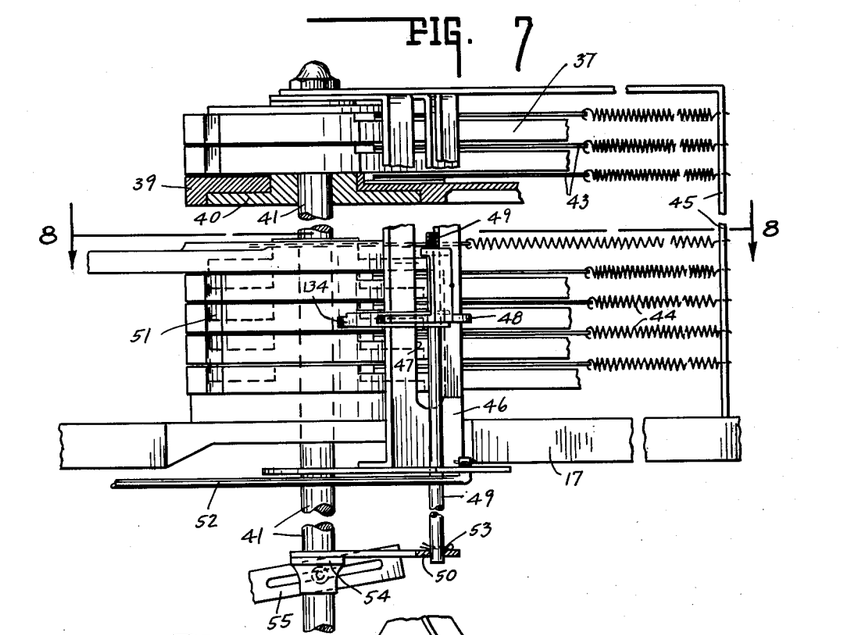
Fig. 7 is a fragmentary sectional elevation showing the record carrier hub structure and associated selector mechanism.
Figure 8:
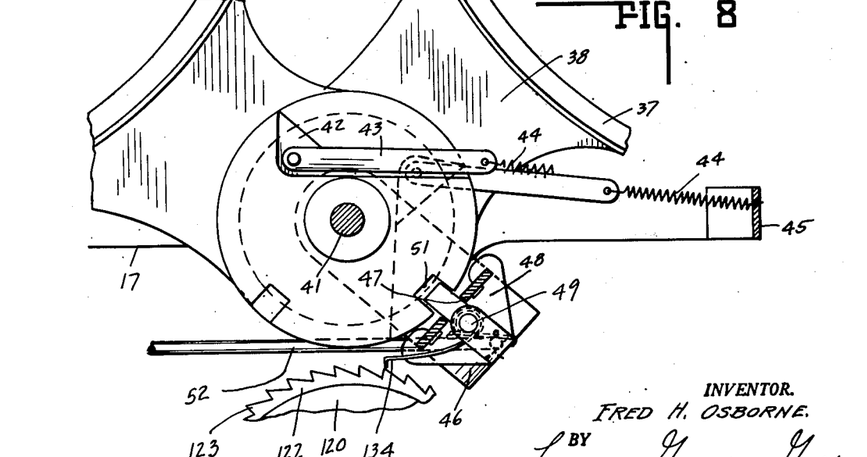
Fig. 8 is a horizontal section taken on the line 8—8 of Fig. 6.

The record magazine 18 comprises a series of superposed record trays 37 arranged in column formation, each supporting a record, of which there are twenty-four trays and records herein shown. Each tray is provided with a supporting arm 38 terminating in a hub portion 39 rotatably supported upon the bearing face of a supporting collar 40 for swinging movement thereon from magazine position to playing position upon the selection thereof. Said collars 40 are mounted in juxtaposed relation on an upright post or shaft 41 disposed at one side of the turntable and extending downwardly through the base plate 17. The collars are somewhat thicker than the hubs 39 and bear one upon another so that each tray 37 is individually journaled and supported on its own collar independently of the others so as to swing freely to and from record playing position. Each of said hubs 39 is provided with a segmental recess 42 in its top side, and arranged in such recess is a pivoted link 43 connected by a coil spring 44 with a bracket 45 secured to and rising from the base plate 17. The upper end of said bracket is tied to the corresponding end of the hub bearing post 41. Pivoted to said post for swinging in an arcuate path about the hubs 39 there is a yoke 46 which is supported from the top of the post so as to be held against movement axially thereof, and which is provided with a longitudinal slot 47 in which is guided a vertically adjustable coupling finger 48 secured to a vertically adjustable upright rod 49 rising from and supported on a guide member 50 slidably mounted on the lower end of the post 41.

Figures 3, 12:
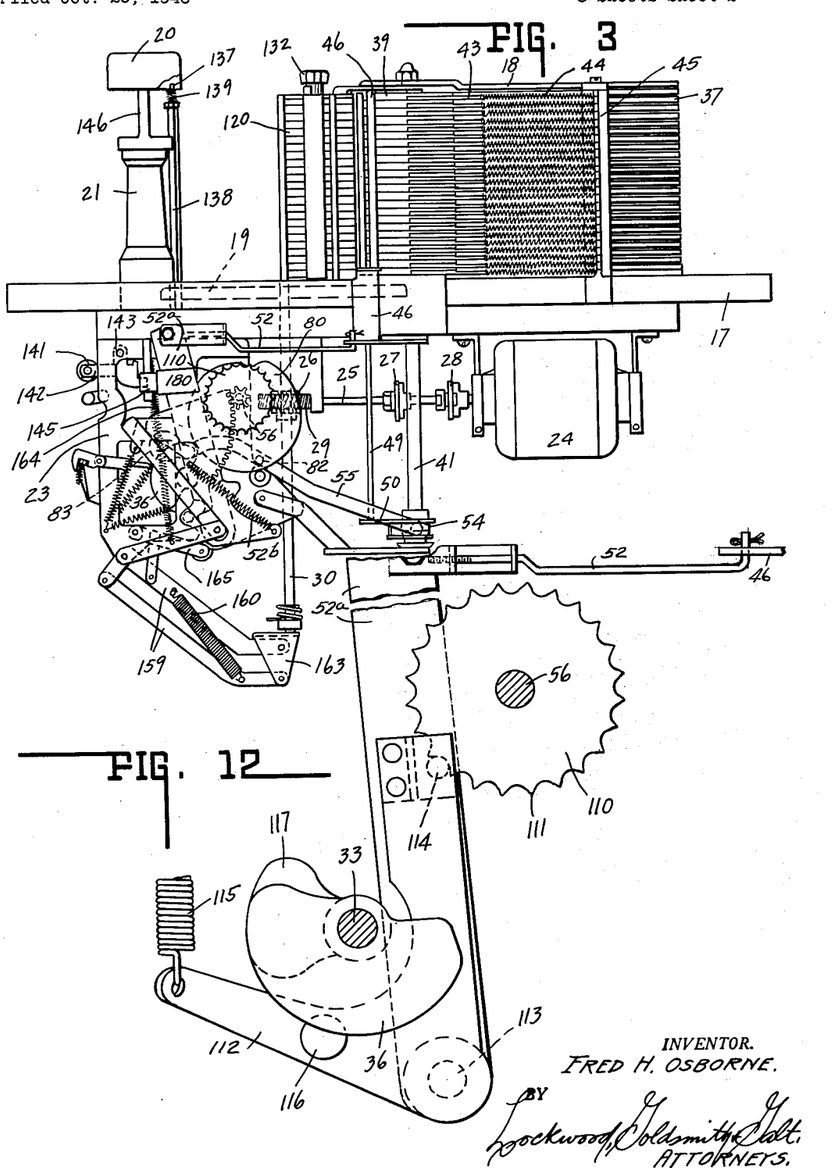
Fig. 3 is a rear elevation of the record changing chassis.
Fig. 12 is a schematic elevation of the positioning and backing off device for the record selector.

In their periphery the hubs 39 of the respective trays are provided with radial notches 51 which, in the normal aligned position of the trays at one side of the turntable, are in vertical alignment and form one continuous groove in which the coupling finger 48 is adapted to travel during the vertical adjustment of the rod 49 to the selective elevations. One of the record carrying trays 37 is selected for swinging movement over the turntable for playing of the record carried thereby through the vertical adjustment of the rod 49. Such adjustment is controlled through the aforementioned cams 35. The swinging of the selected tray from its magazine position over the turntable is effected through the swinging of the yoke 41. For this purpose the yoke is pivotally connected to the free end of a rod 52. The other end of said rod is connected with a shift lever 52a (Figs. 3, 12). The shift lever is biased in one direction by a spring 52b, and is moved in the opposite direction about its pivotal support on shaft 113 by the cam 36.

The finger 48 is threaded upon the upper end of the selecting rod 49 so that it may be adjusted thereon by disconnecting the lower end of said rod from the guide member 50, slightly rotating it to effect adjustment of the finger 48 and locking it to the guide member by a pin 53. Said guide member 50 is carried by a sliding collar 54 having a pin and slot engagement with a lever 55 controlled by the record selecting mechanism, as hereinafter described.

Record selecting mechanism

The record selecting mechanism is actuated through the cam 35 on the cam shaft 33. For this purpose there is provided a rotating selector shaft 56 journaled in the frame 23 in substantially parallel relation to the cam shaft 33. Freely mounted on the shaft 56 there is a pinion 57 with which a segmental gear 58 is positioned to mesh. The segmental gear 58 is loosely pivoted on a stud shaft 59 and includes an adjustable arm 60 likewise fulcrumed on said stud shaft. The arm 60 carries a cam follower 61 which rides upon the operating cam 35. The arm 60 is provided with an angular extension 62 carrying an adjustable contact screw 63, the free end of which abuts the lower edge of the segmental gear 58 for driving it through the action of the cam 35. Thus, through the screw 63 the segmental gear 58 may be accurately adjusted relative to the varying positions of said cam for properly timing the record selecting mechanism in effecting the selected movements of the selector shaft 56. A spring 64 applied to the segmental gear tends to swing it downwardly toward the cam shaft.

The pinion 57 has formed on one side thereof a ratchet wheel 65 engageable by a pawl 66 carried by a brake drum 67 rotatably mounted on the shaft 56. The brake drum 67 is provided with opposed flanges having an intermediate braking surface for receiving a brake band 68 extending about the greater portion of its periphery. One end of the brake band is connected with a strap 69 and the other end thereof is connected to said strap through a tension spring 70. Thus, the brake drum 67 is rotated in a counterclockwise direction through the ratchet and pawl 65, 66 upon the pinion 57 being driven by the segmental gear 58 when it is raised against the tension of the spring 64 by cam 35. But upon the segmental gear being returned through the spring and cam, the shaft 56 is held in its stationary position by the star wheel 110, the pinion being rotated in the opposite direction with the pawl riding over the ratchet wheel.

Also rotatably mounted upon the selector shaft 56 there is a spring housing 71 which houses a clock spring 72 having one end connected to said shaft and the other end to a pin 73 near the periphery of the housing. Interposed between the spring housing and the brake drum 67 there is a disk 74 having a pin 75 extending from one side thereof and a pin 76 extending from the opposite side thereof. The shaft 56 also has a radially extending pin 77 positioned for engagement by the pin 75. The pin 76 is arranged to ride between a pair of spaced abutments 78, 79 on the adjacent face of the brake drum 67.

This arrangement is such that upon the pinion being rotated through the action of the cam 35 and segmental gear 58, it will yieldingly drive the selector shaft 56 in a counterclockwise direction through the pawl 66, overcoming the friction of the brake band 68. Said shaft carries at one end thereof a selector cam 80 somewhat heart shaped in outline, and about its periphery there are theoretically twenty-four positions for effecting the selection of one of the twenty-four records, depending upon the position of the cam. Said cam effects selection of a record through the positioning of the coupling finger 48. For this purpose the cam is provided with a cam slot 81 in which a cam roller 82 engages, said roller being carried by the lever 55 pivoted at one end upon the frame 23 at 83. The cam groove 81 is so shaped that it will cause the coupling finger 48 to traverse all of the record trays during one-half revolution of the cam, and during a complete cycle of movement of said cam said finger will traverse the trays in one direction for selection of the even numbered trays or every other one, and in the reverse direction for the selection of the odd numbered or intermediate trays.

In one type of record selector as commonly used, wherein a coin may be deposited but no selection made, it is desirable that the selector shaft 56 be revolved the full number of selections available plus one so that the shaft is advanced twenty-five twenty-fourths of a revolution when there are twenty-four records in the magazine. This may be accomplished by reason of the fact that the space between the abutments 78, 79 permits pin 76 to move therebetween the angular distance equal to the one additional record or the additional twenty-fifth twenty-fourth of a revolution. This space, therefore, must take into account the thickness of the pin 76 to permit the desired additional one twenty-fourth revolution of movement.

Upon the cam operated rotation of the brake drum 67 in a counterclockwise direction, the selector shaft 56 and consequently the cam 80 is rotated through clock spring 72 until rotation is selectively stopped by a selector pin, as hereinafter described, at a predetermined position for the transfer of a selected record. Thus, rotation of the selector shaft is stopped while rotation of the brake drum 67 continues through the full stroke of the segmental gear 58. The pin 73 will, therefore, wind up the clock spring 72 and store up energy therein for overcoming the friction and returning the brake drum 67 and its associated parts in a clock-wise direction to their initial position when the segmental gear 58 is returned by its spring 64. During the downward travel of said segmental gear 58, the pawl 66 merely rides idly over the ratchet 65. Engagement of pin 77 with pin 75 acts to prevent back lash of shaft 56 under normal stress of spring 52. By reason of the free movement of pin 76 through the space between abutments 78, 79, and should there be no selector pin actuated to stop rotation of the shaft 56, it may be carried an additional one twenty-fourth revolution.

In operation, when the segmental gear 58 is raised (Fig. 5), it rotates pinion 57 in the direction of the arrow (Fig. 6) which through the ratchet teeth 65 and pawl 66 rotates the drum 67 slightly more than one revolution. The drum, through pin 73 engaging in the loop of spring 72, winds the spring down, which in turn rotates shaft 56 to which selector cam 80 (Fig. 5) is secured. But depending upon the selector pin operated, through engagement thereof with lever 86 (Fig. 5) shaft 56 and cam 80 will be arrested at the selected position, whereas the driving drum 67 may continue through its one plus revolution, further winding up spring 72. When gear segment 58 again moves down, pinion 57 has no effect upon drum 67 since pawl 66 will ride over the ratchet teeth 65. But it is desirable to return the spring 72 to its normal position preparatory to the next selection. Thus, said brake band merely has the effect of resisting movement of the drum to permit back lash while permitting movement thereof either in the counterclockwise driving direction by the pawl and ratchet drive, or in the resetting, clockwise direction driven by the unwinding of spring 72.

Figure 9:
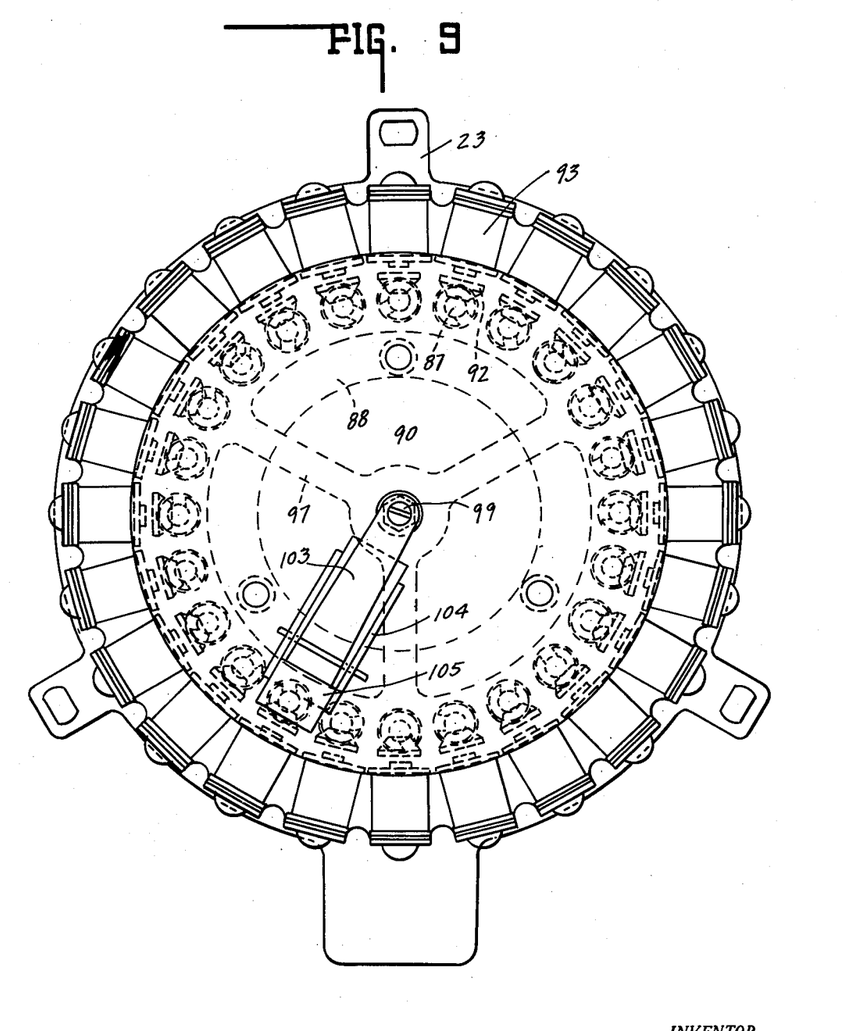
Fig. 9 is a front elevation of the record selector with parts removed.
Figure 10:
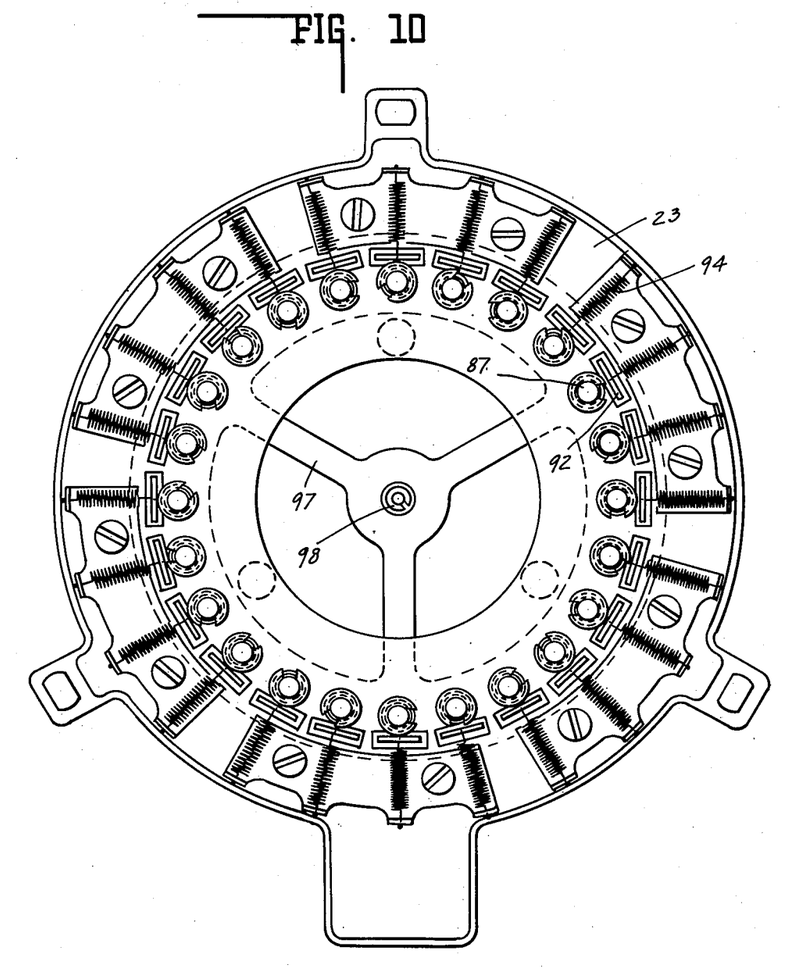
Fig. 10 is a rear elevation thereof with parts removed.
Figure 11:
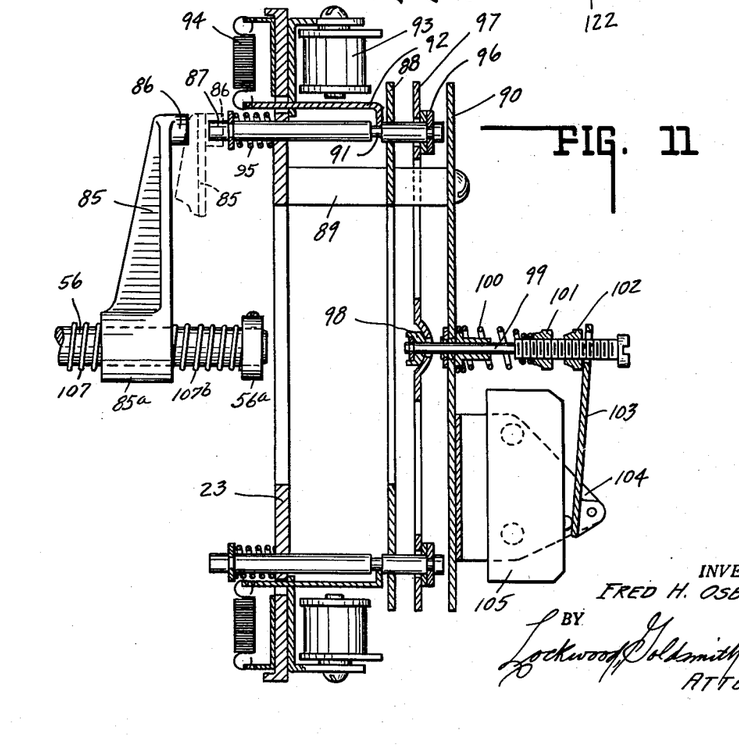
Fig. 11 is a central vertical section therethrough with parts in elevation and parts removed.
Figure 13:
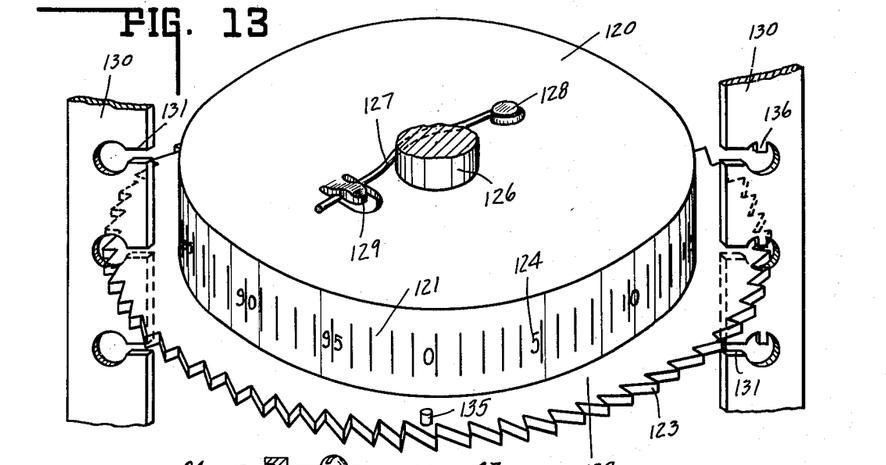
Fig. 13 is a perspective view of one of the record counter drums.

However, in the type of record selector herein particularly shown in Figs. 9, 10 and 11, and in accordance with the particular description thereof as follows, the record changer is not designed to operate to present a selected record for play unless a selection is made. Thus, in this selector, as best illustrated in Fig. 11, it is designed for the coin to first be deposited and then the selection made in the manner described as follows.

Record selector

The record selector operates to selectively position the cam 80 with the coupling finger 48 in position to couple a selected record tray. For this purpose the selector shaft 56 is provided with a radially extending stop arm 85 having a flanged head 86 provided on the end thereof. Carried by the frame 23 there is a selector button panel circular in shape and disposed concentrically of the selector shaft 56. Said panel is provided with an annular series of selector pins 87, there being twenty-four of said pins, one for each record. Said pins are each slidably mounted in the panel of the frame 23 and a bearing plate 88 spaced therefrom. Said bearing plate is supported by the studs 89 about the panel of frame 23, said studs also carrying a spaced plate 90 forwardly of the bearing plate. Each of said pins is provided with an annular groove 91 for receiving a latching armature 92. Each of said armatures extends through a bearing slot of the panel 23 in position to be attracted by an electromagnet 93 supported thereon by a suitable bracket. Said latching armatures are each biased into latching engagement with their respective selector pins by a tension spring 94 connected between the free end of the armature and a bracket on said panel. Thus, upon the electromagnet 93 being energized, it will attract the armature latch to disengage it from the groove 91 to permit the selector pin 87 to slide inwardly under tension of a compression spring 95 into the path of movement of the flanged head 86 on the arm 85.

The other end of each pin has mounted thereon a head in the form of the washer 96 lying in abutment with the periphery of a switch control spider 97 which may be referred to as a floating disk. The central portion of said spider is formed to engage with the head 98 of a plunger 99 biased outwardly by the tension of the compression spring 100 engaging the plate 90 through which the plunger 99 slidably extends. The outer end of said plunger is threaded to receive an adjustable stop nut 101 bearing against the other end of the spring 100, and is also provided with an adjustable nut 102 engageable with a switch lever 103. Said switch lever is pivoted to a bracket 104 upon which is mounted a microswitch 105 through which the phonograph motor 24 is controlled. The circuit to the motor is closed when the switch lever 103 is drawn inwardly to close the circuit through the microswitch, said circuit through the microswitch being broken when the lever is moved outwardly under tension of spring 109.

Upon a selected solenoid 93 being energized through a selecting control circuit of any character, either on the phonograph or remotely positioned, it will release its selector pin which will move into position for stopping the stop arm 85. When the stop arm engages the released selector pin 87, it positions the selector cam 80 through the shaft 56, thereby positioning the coupling finger 48 relative to the selected record tray. Simultaneously with the release of the selector pin, the switch control spider 97 will be drawn inwardly by the washer 96, retracting plunger 99, causing the lever 103 to close the microswitch to start the driving motor 24. The cam shaft 33 will thereupon be rotated to effect the various operations for presenting such selected record for play.

While the plunger head 86 of the stop arm 85 is in engagement with the released selector pin 87, said arm is caused to move forwardly into end abutment with said pin to push it back into latched position. Thereupon said arm is backed off under slight rotation to free the head 86 from frictional engagement with the pin, and returned to its normal position. Through this action the selector pin will have arrested the rotation of the arm to position the cam according to the record selected, followed by the relatching thereof. For this purpose there is provided an arm 106 bifurcated at its opposite ends, one end embracing the shaft 56 and the other end embracing the shaft 33. The end of said arm embracing shaft 56 is adapted to slide the arm 85 on the shaft, for returning the selector pin 87, through the compression spring 107. Said spring is interposed between the hub 85a of the arm and a collar 107a slidable on the shaft 56 with which the end of the arm 106 engages, said spring 107 being interposed between said hub and collar. For actuating the arm 106 to slide the arm 85 forwardly there is a camming button 108a mounted thereon intermediate its ends in position to be engaged and cammed forwardly by the camming member 108, carried by the shaft 33 and caused to rotate therewith. The hub 85a of the arm 85 is slidably keyed upon the shaft 56 through a pin and slot connection therewith. After having been moved forwardly by the arm 106 and the pin 87 having been relatched, the arm 85 is returned to its initial position by a compression spring 107b surrounding the shaft 56 and opposed to the spring 107, being positioned between the opposite side of the hub 85a and a collar 56a secured to the end of the shaft.

Figure 4:
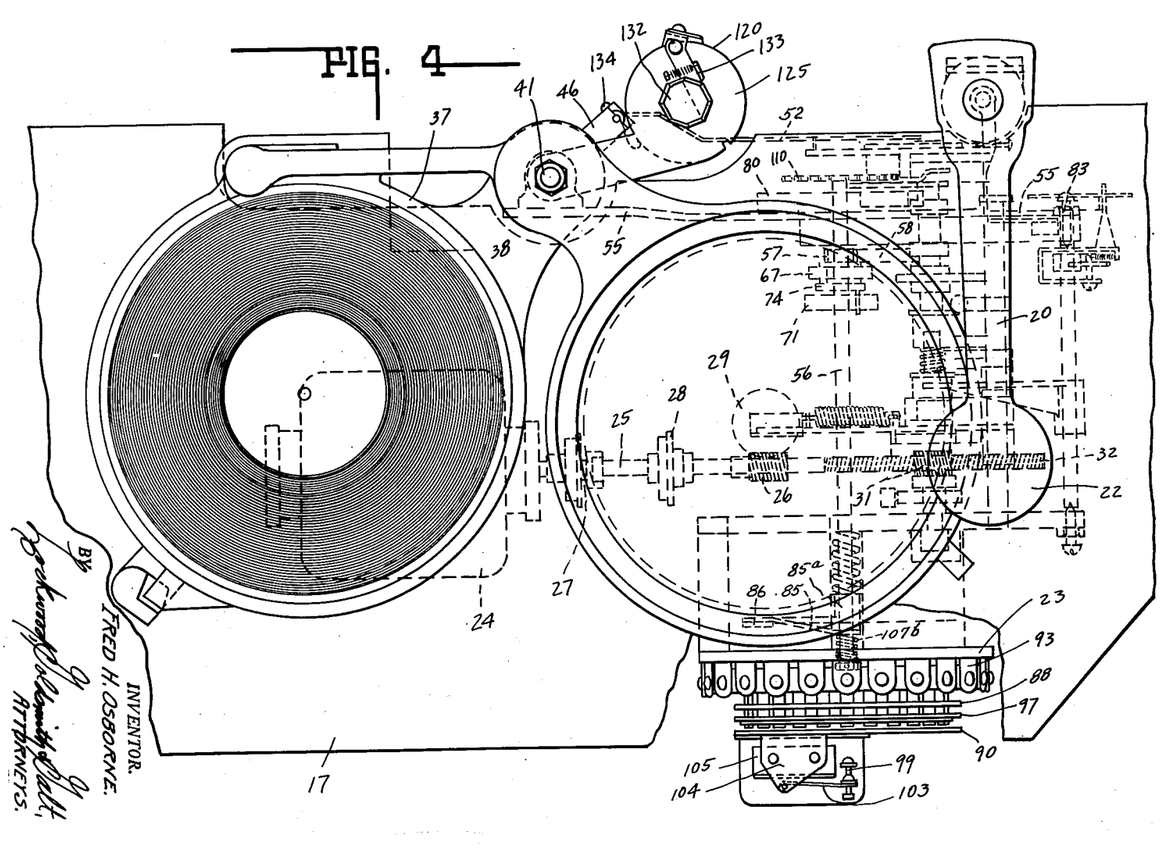
Fig. 4 is a plan view thereof with parts broken away.

For backing off the head 86 of arm 85 from its engaged selector pin, a wheel 110 having shallow peripheral notches forming inclined teeth 111, one for each selector pin, is secured to the selector shaft 56 (Figs. 4 and 12). Associated therewith there is a bell crank lever 112 fulcrumed to the frame 23 at 113. The free end of said bell crank is provided with a pin 114 for camming engagement by one of the teeth 111 of the wheel 110. The other end of the bell crank lever is connected by a tension spring 115 with the frame for yieldingly retaining the pin 114 within the depression between the camming teeth of said wheel. The selector shaft 56 is arrested by the released selector pin 87 in a position a few degrees clockwise from the true position of said shaft for record selection. Before the final positioning of the coupling finger 48, the pin 114 is forced by the tension of spring 115 against the camming surface of the selected tooth 111 to cam the shaft 56 in a "backing up" direction to both accurately set the finger 48 in its record selecting position and move the flanged portion of the head 86 on arm 85 back from engagement with the selector pin so as to completely free it for the resetting action. For actuating the bell crank lever 112 it is provided with a cam follower 116 engageable by a cam 117 acting upon the follower to swing the lever against the tension of its spring 115 during a selecting operation and permit it to move into camming engagement with the wheel 110 when the relieved portion of the cam 117 engages the follower.

*Record counting and recording*

In association with and operable by the record selector above described, there is provided a counting and recording device which designates the number of times each record has been played. This device serves three main purposes. It informs the operator when the end of the record's usefulness is approaching, by reason of the number of plays recorded, so that he may replace the record before it becomes a liability rather than an attraction. Secondly, it indicates the choice of the users or patrons of the phonograph so that the operator may intelligently cater to their tastes more effectively. Thirdly, it provides an additional check on the coin receipts of the phonograph.

For this purpose there is provided a column of counter drums 120, as illustrated in Fig. 3, one for each record tray and representative of the record carried thereby. Each of said drums is cup shaped to provide a peripheral band 121 of approximately the depth or thickness of its associated record tray. About said band there is formed a peripheral outwardly extending flange 122 having a large number of ratchet teeth 123 formed thereon. The band 121 carries about its surface the indicia marks 124, one for each ratchet tooth and numbered progressively thereabout. Each time the record tray corresponding to one of said drums is operated to place a record on the turntable for play, its drum 120 is ratcheted thereby one tooth to present the indicia showing the number of times it has been so operated.

The column of drums 120 is carried between the top bracket plate 125 and a corresponding bracket plate at the bottom thereof having laterally-extending arms which are secured to the bearing post 41 for the record trays 37. Mounted upon and extending between said bracket plates there is a supporting and aligning post 126. On top of each drum there is a yielding friction bearing wire 127 anchored at one end upon the face of the drum at 128 and interlocked at its free end under a lip 129. Normally said wire traverses the post receiving opening in the drum, but is deflected by said post so as to yieldingly engage the side thereof to frictionally clamp the drum thereto while permitting relative rotation therebetween. On each side of the column of drums there are vertical supporting frames 130 having spaced slots 131 for slidably receiving and supporting the ratchet toothed flange 122. Thus, the drums are slidably supported in spaced relation to each other to permit relative rotation therebetween as the individual drums are ratcheted about the stationary post 126. The post 126 is provided at its upper end with a resetting knob 132 engaged by a spring pressed arm 133. By manipulation of the knob 132 the post 126 may be manually rotated, and due to the frictional engagement thereof by the respective bearing wires 127 the drums may be manually returned to zero position by the operator.

For individually ratcheting the counter drums 120 one tooth each time a record tray is swung to record playing position, the coupling finger 40 has associated therewith a spring pawl 134 extending into yielding engagement with the ratchet teeth 123, but normally free therefrom until the coupling finger 48 is actuated.

As above described, the coupling finger carried by the vertically adjustable rod 49 is positioned to couple and swing the selected record tray. In such position the pawl 134 is aligned with the ratchet teeth 123 of the drum representing the record carried by the selected tray. Upon the swinging action to transfer the record, said pawl engages one of the ratchet teeth and rotates the drum through an angular displacement of the width of one tooth. Thus, said drums are individually rotated by the record selector as represented by one tooth each time the corresponding record is played and is retained in such position by the friction of the bearing wire 127. However, at will the operator may return all drums to initial position by manually rotating the post 126 until the drums have been stopped at zero position by a pin 135 engaging a projection 136 in their respective slots 131 carried by one of the supporting frames 130.

*Tone arm control*

The tone arm 20 is supported upon the standard 21 in a position to be engaged by the edge of the record adjacent its starting groove and then is free to be moved inwardly by the engagement of the stylus with the grooves during playing. As it is essential that the tone arm be accurately positioned for record engagement, there is provided for this purpose a tone arm positioning stop in the form of a small spring pressed plunger 137 carried by a post 138, said plunger being biased upwardly by a spring 139 enclosed in a cap threaded into the top of the post. Said plunger 137 is located so that it stands against an abutment 140 just without the downturned edge of the arm when the tone arm is at rest. Said plunger serves to prevent the tone arm from being accidentally moved inwardly until the stylus has been engaged by the record and the tone arm lifted clear of the plunger as the turntable is elevated to slightly raise the record free of its tray. The spring 139 serves to cushion and quiet the replacement of the tone arm after it has been returned to its rest position upon completion of the record play, and as the record is lowered by the turntable onto its tray. During this movement of the record, the abutment 140 is again rested upon the plunger.

Figures 5, 6:
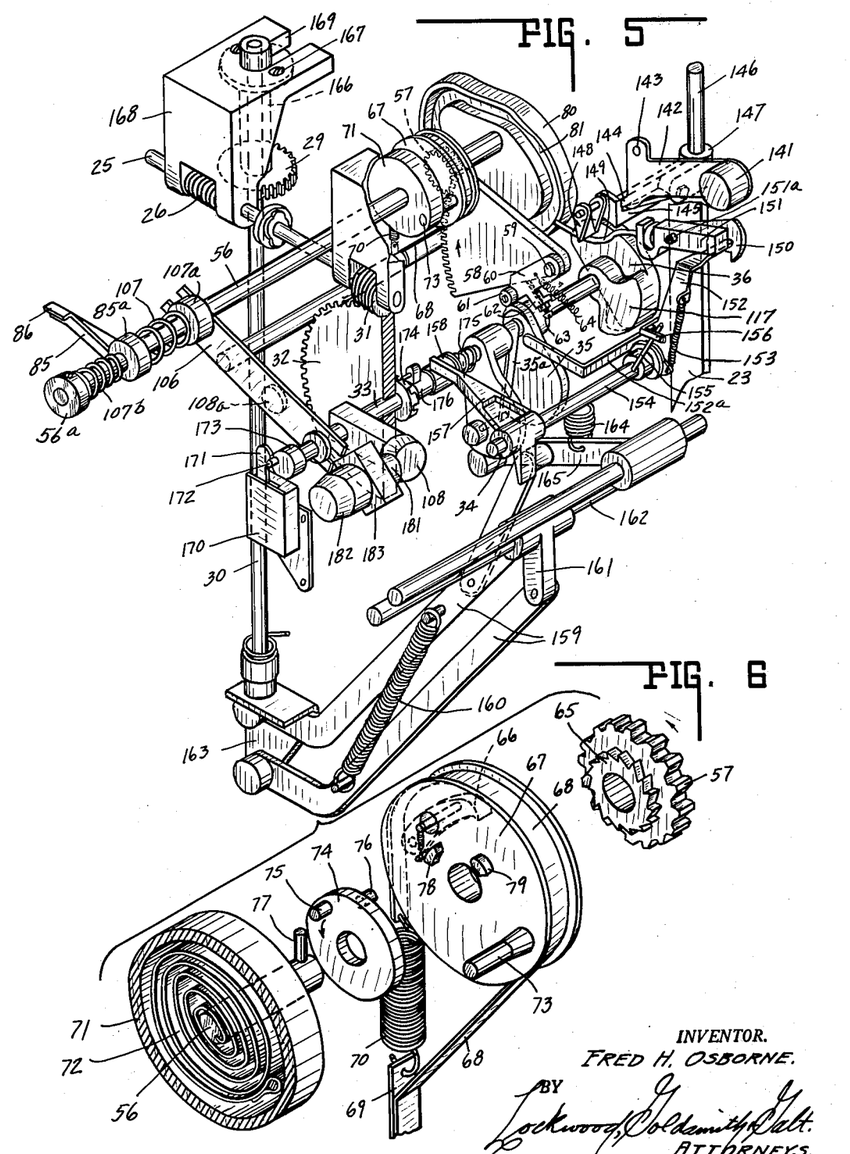
Fig. 5 is a schematic perspective view of the actuating mechanism with parts broken away and parts in section.
Fig. 6 is an exploded perspective view showing a portion of the record selecting mechanism.

As shown in Figs. 3 and 5, a weight 141 is mounted on the free end of a small lever 142 pivotally mounted at 143 to the frame, having a lip 144 in pressing engagement against a trip arm 145 to bias said arm inwardly under the influence of the weight about the axis of a tone arm control rod 146 to which it is secured by a clamping collar 147. Said rod 146 extends through the standard 21, having its upper end extending downwardly below the base plate 17 so that it swivels as the tone arm swings over the record. As the trip arm is pressed outwardly, the weight 141 is lifted and presses the tone arm against the plunger 137, holding it there until the tone arm is lifted by an ascending record. The weight then pushes the trip arm 145, and with it the tone arm, inwardly to move the stylus from the smooth margin of the record into the fixed groove thereof.

As the tone arm is moved inwardly toward the center of the record during the playing, the rod 146 moves the trip arm 145 about its axis, said trip arm carrying a knife edge pawl 148 over a notched rod 149 connected with a tripping arm 150 mounted upon a counterbalance weight 151. Said weight is pivotally mounted on the fixed frame 23 at 151a. Said tripping arm when in balanced position is in latching engagement with a trip lever 152, which is biased outwardly by a spring 153 connected with a projection on a return arm 152a having its bearing on a control shaft 154.

The trip lever 152 has its bearing for pivotal movement on the shaft 154 independently of arm 152a so that the spring 153 connecting said return arm and trip lever 152 is under tension to move said lever to the right when released by the trip arm 150 upon completion of a record. Such movement of lever 152 to the right upon release causes a bracket finger 156 to engage pin 135 extending outwardly from and secured to the control shaft 154 for oscillating said shaft.

As the tone arm moves inwardly over the record, the pawl 148 is dragged over the notches of the rod 149. Upon reverse movement thereof, due to the eccentric terminal grooves of the record, it engages one of the notches, depressing the rod to tilt the weight 151 about its pivot 151a to cause the tripping arm 150 to release the trip lever 152, whereupon spring 153 will move it to oscillate the control shaft 154 through the pin 155.

The control shaft 154 carries on one end thereof a clutch actuating lever 157 which normally engages clutch 158, holding it against tension of spring 175, but which releases clutch 158 into clutching position upon the above-mentioned oscillation of control shaft 154, by being raised upwardly from engagement therewith, as hereinafter described. Therefore, oscillation of shaft 154 permits clutch engagement to again bring the record changing mechanism into operation at the completion of the record, to lower the turntable from its engagement with the stylus of the tone arm and return the tone arm to its rest position.

Such record changing action involves one revolution of shaft 33 which has mounted thereon a spring arm 35a normally engaged by the end of the arm 152a. Such rotative movement of the shaft 33 during the record changing cycle causes the trip lever 152 to be relatched by the trip arm 150 by the engagement of the spring arm 35a with arm 152a, as the record changing cycle is completed. It also causes shaft 154 to move its clutch lever 157 into camming engagement with the clutch 158 to move it against spring 175, to thereby release the clutch and bring the record changing mechanism to rest.

During the record changing cycle the played record is returned to its tray through the lowering of the turntable, and the tray is swung back to the magazine through movement of the lever 52a and rod 52. Lever 52a (Fig. 3) carries a bracket 180 extending into engagement with the trip arm 145 extending from the tone arm (Fig. 5). Thus, as the tray is returned, the tone arm is swung outwardly to its initial position for engagement by a new record.

Turntable control

After a tray has placed a selected record over and in alignment with the turntable which at rest is in its lowermost position, the turntable 19 is elevated to engage the bottom of the record and lift it free of the tray into engagement with the stylus of the reproducer. The turntable is keyed upon the upper end of the turntable spindle 30. The turntable spindle with the turntable is raised and lowered by parallel link connections 159 yieldingly connected together for balancing of their movement by the tension spring 160. The operating ends of said levers are connected to a boss 161 carried by a shaft 162. The free ends of said levers are pivotally connected to a bearing member 163 upon which the lower end of the spindle 30 is seated. To permit of flexibility and prevent rigid elevating movement of the turntable in engaging the record, the upward or elevating movement of the spindle is effected by a tension spring 164 connected at its lower end to a cam follower arm 165 and at its upper end to the underside of the main frame structure 23.

The cam follower arm 165 is controlled by the cam 34 which depresses the cam follower against the tension of spring 164. Said cam follower 165 is secured to the shaft 162 so that said shaft is oscillated in one direction by the cam 134 and in the opposite direction by the spring 164.

The turntable is, therefore, elevated under spring tension, but lowered against the spring tension by the positive action of the cam. This is of decided advantage in that breakage of records, damage of trays or burning out of the motor is avoided in event that through some maladjustment the record tray and record are not properly centered for receiving the upwardly moving turntable. If the upward movement of the turntable is obstructed by any such maladjustment, the spring 164, as its elevating medium, permits the turntable to be arrested without damage to the obstructing parts, as distinguished from the breakage which would occur if the elevation thereof was effected by the positive action of the cam as heretofore.

The upper end of the turntable spindle 30 has its bearing in a demountable bearing sleeve 166 held by the screws 167 to a sub-frame 168 which is suitably attached to the underside of the main frame structure 23. Said sub-frame 168 is bifurcated at 169 to permit of adjustable mounting of the bearing sleeve therein for accurate location and alignment of the turntable spindle 30. By such adjustable bearing manufacturing tolerances are compensated for in obtaining the essential accuracy of the turntable movement relative to the positioning of the record trays and records.

Record changing cycle

In parallel with the microswitch 105 there is a second switch 170 having a control lever 171 extending in position to be engaged by a pin 172 carried at the peripheral edge of a roller 173 mounted on the main cam shaft 33. The lever 171 is biased so as to be moved by the pin against spring tension to circuit breaking position at the completion of each cam actuating cycle. By means of this switch, if the circuit through the selector pin controlled microswitch 52 is broken, all of the pins having been returned to normal position by the arm 85, the cam shaft comes to rest at the end of a cycle by opening of the switch 170. However, if any selector pins remain in actuated position so that switch 105 is closed, the opening of switch 170 has no effect on the circuit and the cam shaft continues to function as long as there remains any selections to be played.

The record changing mechanism is brought to rest after a record is placed for playing by declutching of a clutch 174 through actuation of the clutch collar 158 by the release lever 157 which is actuated by the tone arm trip mechanism as above described. The oscillation of its control shaft 154 causes the free end of lever 157 to be raised to permit a clutch actuating spring 175 to slide a clutch collar 176 toward the clutch 174, causing inter-engagement therebetween. Upon such clutch engagement a further cycle of record changing operation takes place through the driving of the cams by the clutched cam shaft 33.

At the end of the last selected record, the circuit to the motor 24 is opened through opening of the switch 105 actuated by the return to normal of the last actuated rod 87 and the subsequent opening of switch 170 which is in parallel with switch 105 and is actuated by cam 172 as shaft 33 returns to starting position. When another record is selected, the motor circuit is again closed as above described, and the selected record brought out for play.

Since the record changer depends for its proper operation upon the angular position of the cam shaft 33, it is desirable to positively arrest the shaft within a small angular displacement at the end of its operating cycle. For this purpose use is made of the camming member 108 utilized for actuating the selector pin cancelling mechanism. For locating the cam shaft at the proper angular position at the end of the cycle, a spring loaded plunger 181 with a convex end is mounted upon the frame by a stud 182. Its spring actuated yielding movement is lateral to the annular movement of the camming member 108, and its convex end enters a short distance into the rotary path thereof. The spring of the plunger, contained within a box 183, is of insufficient force to arrest the movement of the cam shaft while driven by the motor. However, the spring is strong enough to resist displacement of the plunger 181 by the camming member 108 when rotated into engagement therewith during the period immediately following deenergization of the motor while the mechanism is coasting. Thus, after the motor stops its driving action, followed by a coasting movement of the mechanism, it is brought to a stop in a predetermined position determined by the engagement of the plunger by the camming member.

The invention claimed is:

1. In an automatic multi-selective phonograph including a turntable, a magazine for containing a plurality of records, a record transfer means for selectively moving a selected record from said magazine to said turntable for play and returning it to said magazine, and an electric motor for driving said transfer means, the combination therewith of a record selector rotatable to a different position for each record for selectively positioning said record transfer means, an annular series of selector pins biased to position for arresting said selector at a selected position, means for slidably supporting said pins, a floating disk movable by said pins when moved to arresting position, electrically controlled means associated with each of said pins for releasing it to arresting position, a control circuit for said motor, and a switch for closing said circuit actuated by said disk upon movement of one or more of said pins to arresting position and opening said switch upon return of said pins therefrom.

2. In an automatic multi-selective phonograph including a turntable, a magazine for containing a plurality of records, a record transfer means for selectively moving a selected record from said magazine to said turntable for play and returning it to said magazine, and an electric motor for driving said transfer members, the combination of a record selector rotatable to a different position for each record for selectively positioning said record transfer means, an annular series of selector pins biased to position for arresting said selector at a selected position, means for slidably supporting said pins, a floating disk movable by said pins when moved to arresting position, an electromagnet actuated latch for each of said pins normally restraining said pins from arresting position adapted to release said pins to arresting position upon being energized, a control circuit for said motor, and means actuated by the movement of said floating disk upon release of one of said pins for closing said circuit.

3. In an automatic multi-selective phonograph including a turntable, a magazine for containing a plurality of records, a record transfer means for selectively moving a selected record from said magazine to said turntable for play and returning it to said magazine, and an electric motor for driving said transfer means, the combination therewith of a record selector rotatable to a different position for each record for selectively positioning said record transfer means, an annular series of selector pins biased to position for arresting said selector at a selected position, means for slidably supporting said pins, a floating disk movable by said pins when moved to arresting position, a latch engageable with each of said pins for restraining it from movement to arresting position, an electromagnet for actuating each of said latches to release its pin for movement to arresting position, a control circuit for said motor having a control switch therein, a plunger connected with said disk and switch for closing said switch upon said disk being moved by one of said pins, and a spring associated with said plunger for opening said switch and moving said disk to normal position upon return of the actuating pins from arresting position.

4. In an automatic selective phonograph including a turntable, a magazine for containing a plurality of records, and a record transfer means for selectively moving a selected record from said magazaine to said turntable for play and returning it to said magazine, the combination therewith of a record selector rotatable to a different position for each record for selectively positioning said record transfer means, a shaft connected with said selector, a power transmitting disk yieldingly connected with said shaft having a pair of spaced abutments, a driving pin mounted radially of said shaft, an adaptor mounted between said disk and pin having a driving pin on one side thereof extending between said abutments for engagement therewith, and a pin on the other side thereof mounted for engagement with said driving pin, said pins being so related relative to said abutments as to rotate said shaft and selector one complete revolution plus an angular displacement equal to the angular displacement of said selector for each successive record, whereby if no record selection is made said selector will be rotated through one complete selecting cycle and positioned to select the next succeeding record.

5. In an automatic selective phonograph including a turntable, a magazine for containing a plurality of records, and a record transfer means for selectively moving a selected record from said magazine to said turntable for play and returning it to said magazine, the combination therewith of a record selector rotatable to a different position for each record for selectively positioning said record transfer means, a shaft connected with said selector, a power transmitting disk freely rotatable upon said shaft, power means for rotating said disk in one direction, said disk having a pair of spaced abutments on one side thereof, an over-run adaptor mounted on said shaft having a pin extending into the space between said abutments, means for yieldingly connecting said disk with said shaft, a radially extending pin on said shaft adjacent said adaptor, and a pin on the opposite side of said adaptor in position for driving engagement with said radially extending pin, said pins and abutments being so related and spaced relative to each other as to drive said shaft and selector through one complete cycle of rotation coextensive with the selecting positions of all of the records and an additional angular displacement coextensive with its selecting position for the next succeeding record.

FRED H. OSBORNE.

REFERENCES CITED

The following references are of record in the file of this patent:

UNITED STATES PATENTS

| Number | Name | Date |
| --- | --- | --- |
| 521,332 | Carroll | June 12, 1894 |
| 2,002,236 | Wilcox | May 21, 1935 |
| 2,189,077 | Maurer | Feb. 6, 1940 |
| 2,214,913 | Vischer | Sept. 17, 1940 |
| 2,215,141 | Wilcox | Sept. 17, 1940 |
| 2,243,698 | Freborg et al. | May 27, 1941 |
| 2,255,216 | Henry | Sept. 9, 1941 |
| 2,287,560 | Osborne et al. | June 23, 1942 |
| 2,318,526 | Rockola | May 4, 1943 |
| 2,319,945 | Osborne et al. | May 25, 1943 |
| 2,484,570 | Johnson | Oct. 11, 1949 |
| 2,496,056 | Lannerd | Jan. 31, 1950 |